United States Patent [19]

Goda

[11] Patent Number: 5,303,622

[45] Date of Patent: * Apr. 19, 1994

[54] DEVICE FOR PREVENTING DEFLECTION OF ELONGATED WORKPIECES

[76] Inventor: Hidemitsu Goda, 2-20-9, Oimazato, Higashinari-ku, Osaka-shi, Osaka, 537, Japan

[*] Notice: The portion of the term of this patent subsequent to Oct. 9, 2007 has been disclaimed.

[21] Appl. No.: 474,750

[22] PCT Filed: Sep. 5, 1988

[86] PCT No.: PCT/JP88/00896

§ 371 Date: Mar. 22, 1990

§ 102(e) Date: Mar. 22, 1990

[87] PCT Pub. No.: WO90/02622

PCT Pub. Date: Mar. 22, 1990

[51] Int. Cl.$^5$ ............... B23B 13/10; B23B 15/00
[52] U.S. Cl. ................................. 82/127; 82/126
[58] Field of Search ................ 82/124, 125, 126, 127

[56] References Cited

U.S. PATENT DOCUMENTS

| 851,547 | 4/1907 | Muncaster | 82/124 X |
|---|---|---|---|
| 3,874,520 | 4/1975 | Scheler | 82/124 X |
| 4,200,013 | 4/1980 | Momoi et al. | 82/127 |
| 4,324,162 | 4/1982 | Uehara | 82/127 |
| 4,700,593 | 10/1987 | Cucchi | 82/125 X |
| 4,961,358 | 10/1990 | Goda | 82/127 |

FOREIGN PATENT DOCUMENTS 1180162 9/1985 U.S.S.R. ......................... 82/125

*Primary Examiner*—Z. R. Bilinsky
*Attorney, Agent, or Firm*—Sixbey, Friedman, Leedom & Ferguson

[57] ABSTRACT

A device for preventing deflection of an elongated workpiece rotating about its longitudinal axis is provided with a contact ring (9) that is rotatably mounted about a support shaft (12) perpendicular to the axis of rotation of the contact ring (9). The angle of inclination of the rotational axis of the contact ring (9) is variable relative to the rotational axis of the elongated workpiece (M) inserted throught the ring (9), by rotating the housing (6) about the support shaft (12). The periphery of the workpiece (M) is supported by the inner periphery of the contact ring (9) at two points, i.e., at axial ends of the contact ring. Thus, elongated workpieces of different diameters can be supported by varying the inclination angle of the axis of the contact ring (9) relative to the workpiece (M).

14 Claims, 6 Drawing Sheets

DEVICE FOR PREVENTING DEFLECTION OF ELONGATED WORKPIECES

TECHNICAL FIELD

The present invention relates to a device for preventing the deflection of elongated workpieces rotating about their longitudinal axis.

BACKGROUND ART

Elongated workpieces are machined by apparatus such as lathes, while being rotated about their longitudinal axis. If the workpiece deflectively revolves in this case, problems such as reduced machining accuracy and a break in the cutting tool will arise.

FIG. 11 shows a device for preventing the deflection of an elongated workpiece rotating about its longitudinal axis. This device comprises a plurality of bolts 31 screwed through a frame 30 around the elongated workpiece M, and a contact member 32 attached to the forward end of each bolt 31. The bolts are moved inwardly or outwardly of the frame 30 in accordance with the outside diameter of the workpiece M to cause the contact members 32 to support the outer periphery of the workpiece M against deflection.

With the deflection preventing device shown in FIG. 11, however, the elongated workpiece M is supported at only one point along its length, therefore greatly deflectively revolves in front and rear of the supported position as seen in FIG. 10 and can not be prevented from deflection fully effectively. When some kinds of elongated workpieces M which are different in outside diameter are to be supported by the device, the plurality of bolts 31 must be rotated individually to adjust the amount of projection of each bolt into the frame 30, hence a very cumbersome adjusting procedure.

An object of the present invention is to overcome the foregoing drawbacks of the prior art.

DISCLOSURE OF THE INVENTION

The present invention provides a device for preventing deflection of an elongated workpiece M rotating about its longitudinal axis, the device being characterized in that it comprises a housing 6, and a contact ring 9 rotatably mounted on the housing 6 for inserting the elongated workpiece M therethrough, the housing 6 being rotatable about a support shaft 12, the support shaft 12 being perpendicular to the axis of rotation of the contact ring 9, the angle of inclination of the rotational axis of the elongated workpiece M relative to the axis of rotation of the contact ring 9 being variable by the rotation of the housing 6 about the support shaft 12, the outer periphery of the elongated workpiece M being supportable by the inner periphery of the contact ring 9 at its axial one end and at the other end thereof.

Thus, the elongated workpiece M is supported by two points, i.e., one end and the other end of the inner periphery of the contact ring 9, with the result that the deflective revolution of the workpiece M is smaller as seen in FIG. 9 than is the case with FIG. 10. Further when a plurality of kinds of elongated workpieces M different in outside diameter are to be supported, the angle of inclination of the rotational axis of the contact ring 9 is variable relative to the rotational axis of the workpiece M by rotating the housing 6 about the support shaft 12, whereby the contact ring 9 is adapted to support each of the workpieces M of different outside diameters with one end and the other end of its inner periphery.

Preferably, the housing 6 is in the form of a hollow cylinder, and the contact ring 9 is fitted in the cylindrical housing 6, whereby the contact ring 9 can be held in place with good stability.

Preferably, a bearing 7 is interposed between the housing 6 and the contact ring 9. This renders the contact ring 9 smoothly rotatable.

The elongated workpiece M can be prevented from defacement by preparing the contact ring 9 from a material other than the metal.

The contact ring 9 may be in the form of an integral piece or may comprise two divided segments as arranged side by side axially of the ring.

The angle of rotation of the housing 6 about the support shaft 12 can be adjusted promptly by adjusting means 17 therefor for elongated workpieces M of different outside diameters.

When equipped with drive means 16 for rotating the housing about the support shaft 12, the device is usable also for machining apparatus which are operable without any operator.

BRIEF DESCRIPTION OF THE DRAWINGS

FIG. 1 is a front view of the device;

FIG. 2 is a view in section taken along the line A—A in FIG. 1;

FIG. 3 is a perspective view of a stopper ring;

FIG. 4 is a perspective view of the device in use;

FIG. 5 is a front view of the device;

FIG. 6 is a view in section taken along the line B—B in FIG. 5;

FIGS. 7 and 8 are sectional views showing the device in different states during use;

BEST MODE OF CARRYING OUT THE INVENTION

A first embodiment of the invention will be described with reference to FIGS. 1 to 4.

Figure 4:
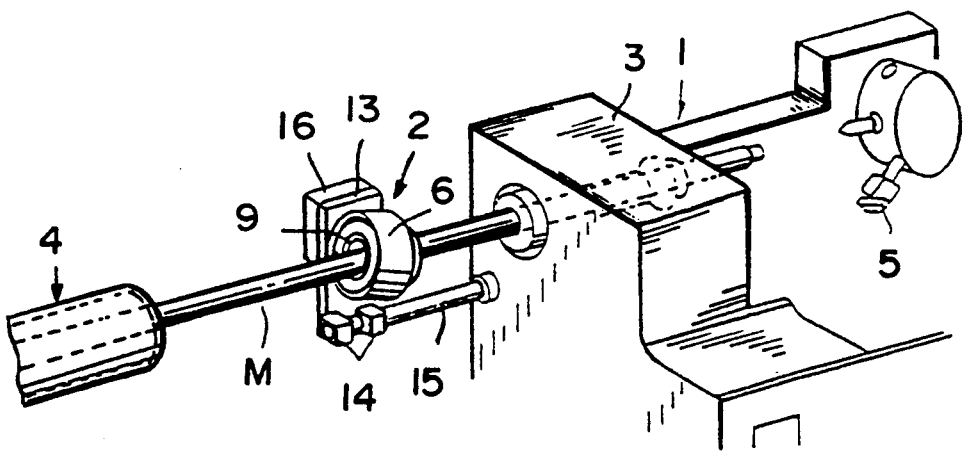

FIG. 4 shows a device 2 for preventing deflection of the elongated workpiece M to be machined by a machining apparatus 1. The machining apparatus 1 has a support block 3 for supporting an intermediate portion of the elongated workpiece M and rotates the workpiece M about its longitudinal axis. A feeder 4 also supports the workpiece M at its one end and feeds the workpiece axially thereof to the machining apparatus 1. The elongated workpiece M thus rotated about its longitudinal axis and fed axially thereof is cut to the desired configuration by a cutting tool 5.

Between the machining apparatus 1 and the feeder 4, the elongated workpiece M is prevented from deflective revolution by the deflection preventing device 2.

Figure 1:
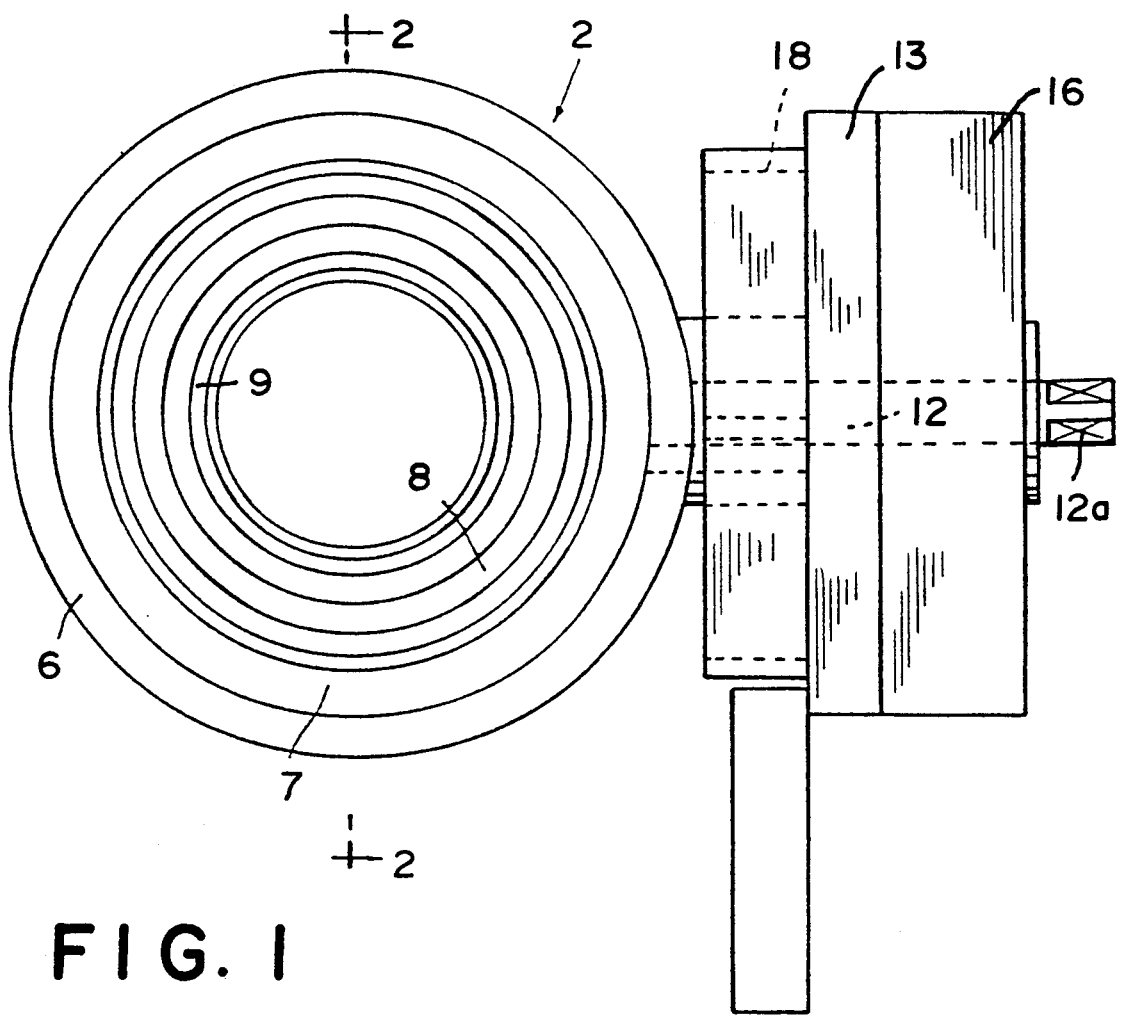
FIGS. 1 to 4 show a deflection preventing device as a first embodiment of the invention.
Figure 2:
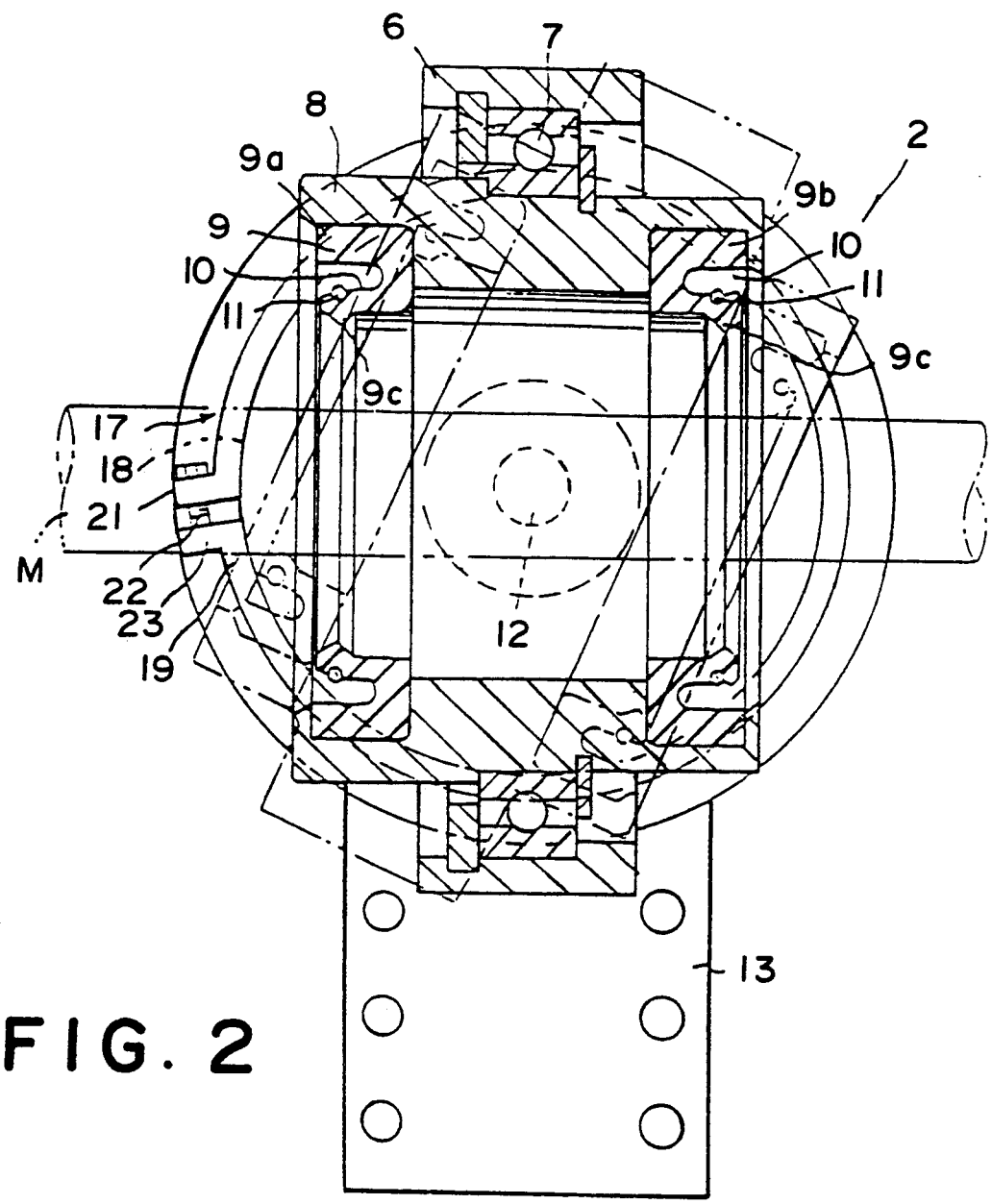

With reference to FIGS. 1 and 2, the device 2 comprises a housing 6 in the form of a hollow cylinder, and a ring holder 8 in the form of a hollow cylinder and rotatably mounted by a bearing 7 on the housing 6. A contact ring 9 made of resin is held by the ring holder 8. The elongated workpiece M is inserted through the contact ring 9.

With the present embodiment, the contact ring 9 is divided into a first ring 9a at one axial end of the ring 9 and a second ring 9b at the axial other end thereof. An annular cutout 10 is formed in one end face of each of the first ring 9a and the second ring 9b. An annular spring 11 is fitted around the radially inner portion defining the cutout 10. Each of the first ring 9a and the second ring 9b is integrally formed with a contact portion 9c V-shaped in cross section and projecting from the ring inner periphery radially inwardly thereof.

A support shaft 12 extends outward from the outer periphery of the housing 6 perpendicular to the axis of rotation of the contact ring 9. The support shaft 12 is rotatably supported by a mount bracket 13. Support brackets 14 and a support rod 15 are connected to the mount bracket 13 as seen in FIG. 4. The support rod 15 is attached to the machining apparatus 1. The housing 6 is rotatable about the support shaft 12.

Also attached to the mount bracket 14 is a hydraulic cylinder 16, by which the housing 6 is drivingly rotatable about the support shaft 12. The support shaft 12 is projected from the hydraulic cylinder 16, and the projection 12a is in the form of a rod of square cross section so as to be engageable by a tool such as a spanner. The housing 6 is rotatable also manually.

Figure 3:
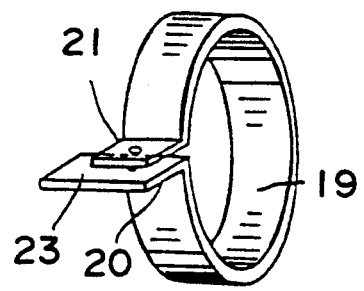
Figure 5:
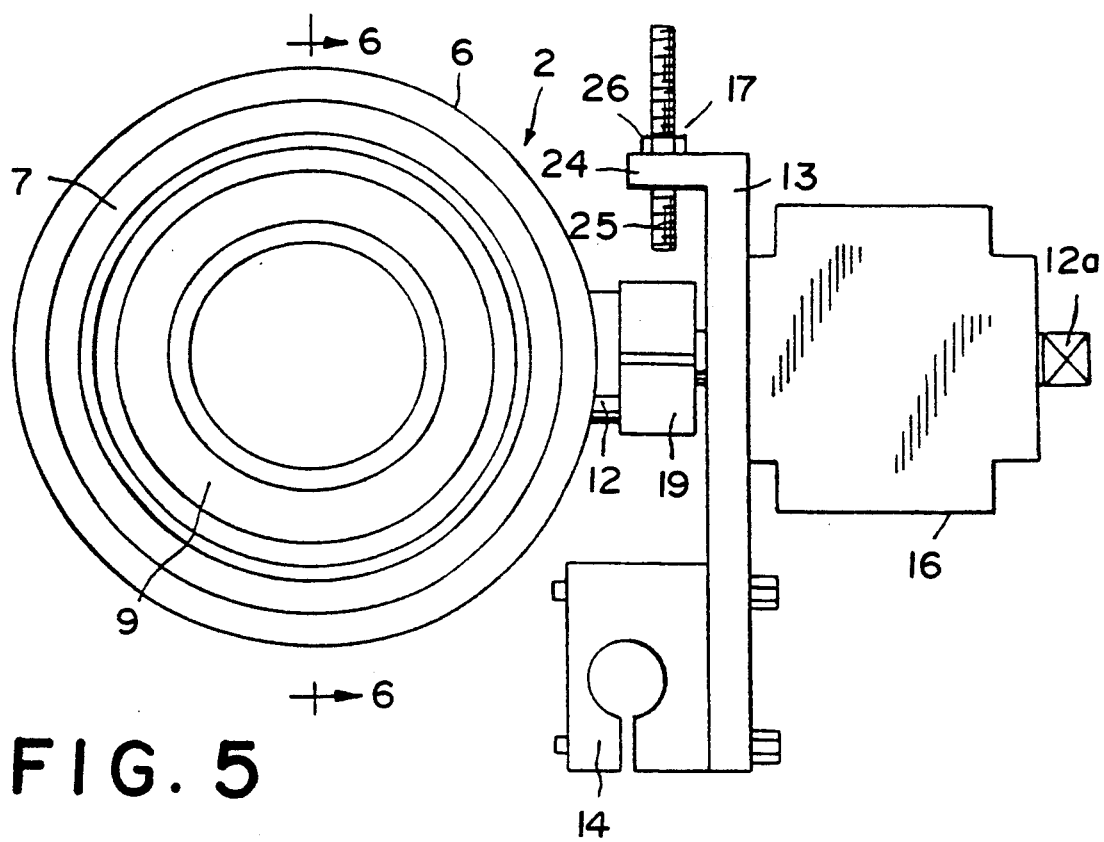
FIGS. 5 to 8 show another deflection preventing device as a second embodiment of the invention.
Figure 9:
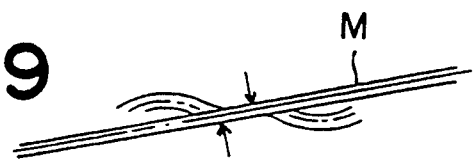
FIG. 9 is a diagram illustrating the principle of the invention.
Figure 10:
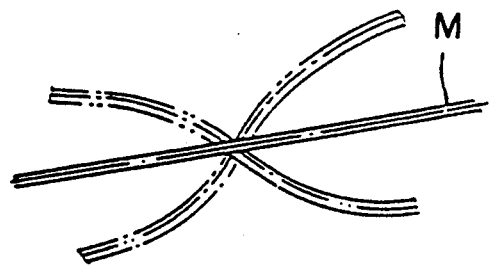
FIG. 10 is a diagram illustrating the principle of the prior art.
Figure 11:
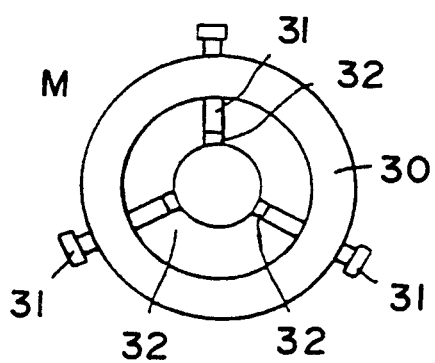
FIG. 11 is a front view of a conventional deflection preventing device.

The mount bracket 14 is further provided with means 17 for adjusting the angle of rotation of the housing 6 about the support shaft 12. The adjusting means comprises a stopper ring 19 fitted around a hollow cylinder 18 projecting from the mount bracket 13 toward the housing 6 and concentric with the shaft 12. As shown in FIGS. 2 and 3, the stopper ring 19 has a divided portion, and lugs 20, 21 extend from the respective divided ends radially outwardly of the ring. The stopper ring 19 is fixedly fastened to the cylinder 18 by interconnecting the two lugs 20, 21 with a bolt 22. The lug 20 is integral with an engaging piece 23 extending therefrom toward the housing 6. The housing 6 is in engagement with the engaging piece 23, whereby the angle of rotation of the housing 6 about the support shaft is determined as specified as indicated in phantom line in FIG. 2. The angle of rotation of the housing 6 about the shaft 12 is adjustable by rotating the stopper ring 19 relative to the cylinder 18 and shifting the engaging piece 23 circumferentially of the cylinder.

The elongated workpiece M can be prevented from deflective revolution by the device 2 by inserting the workpiece M through the contact ring 9, rotating the housing 6 about the support shaft 12 and thereby causing the outer periphery of the workpiece M to be supported at two positions, i.e., by the inner periphery of the first ring 9a and the inner periphery of the second ring 9b as indicated in phantom line in FIG. 2. The deflection of thw workpiece M can be diminished by supporting the workpiece M at the two points in this way. The contact ring 9 is not made of metal and therefore will not deface the workpiece M while supporting the workpiece. The contact ring 9 may be made of a soft metal.

Although the housing 6 may be rotated manually about the support shaft 12, the use of the hydraulic cylinder 16 permits an unattended operation of the device as well as the machining apparatus 1. In this case, an electric motor, for example, may be used in place of the hydraulic cylinder 16 insofar as the cylinder can be thereby driven.

Since the housing 6 is hollow cylindrical, the contact ring 9 can be held in place with good stability, and the presence of the bearing 7 renders the contact ring 9 smoothly rotatable.

When the device is to be used for preventing the deflection of an elongated workpiece M of different outside diameter, the position of the engaging piece 23 is altered by rotating the stopper ring 19 relative to the cylinder 18. The housing 8 is thereafter rotated about the support shaft 12 to vary the angle of inclination of the rotational axis of the contact ring 9 relative to the rotational axis of the contemplated workpiece M, whereby the workpiece M of different outside diameter can be supported by the inner periphery of the first ring 9a and the inner periphery of the second ring 9b.

FIGS. 5 to 8 show a second embodiment of the invention. Throughout the drawings showing the first and second embodiments, like parts are designated by like reference numerals, and different features only will be described.

Figure 6:
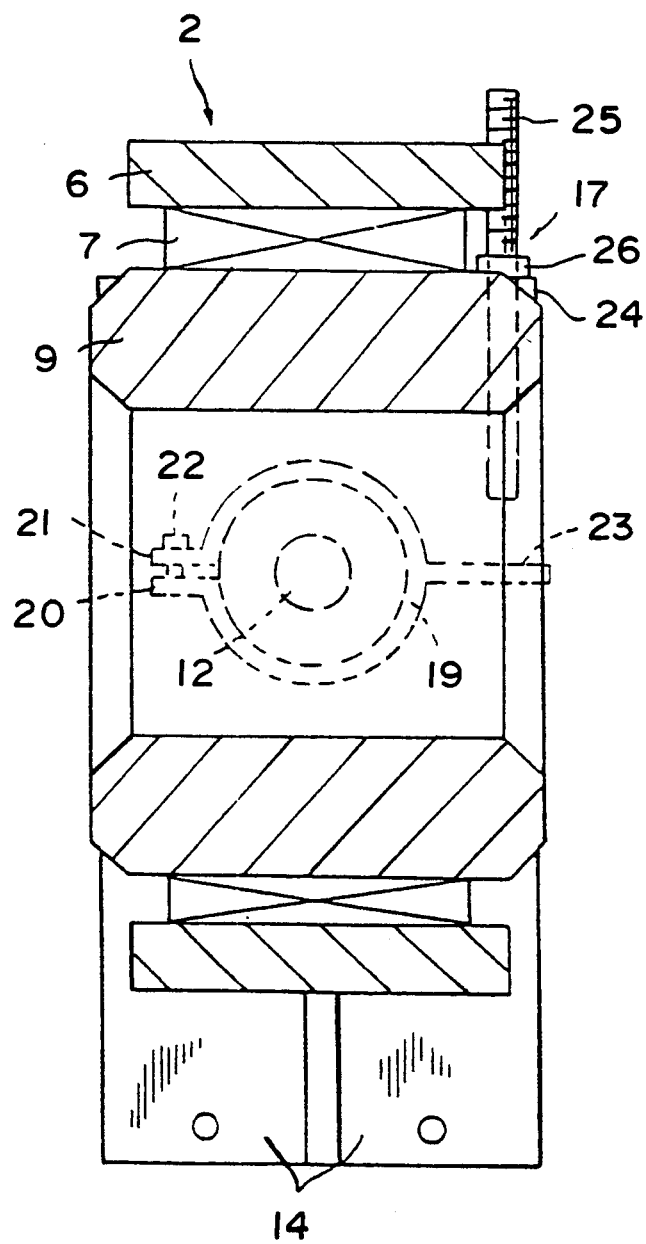

The contact ring 9 of the second embodiment is not divided into two segments but is in the form of a single member and is supported directly by the bearing 7. It is simpler in cross sectional configuration than the ring of the first embodiment as seen in FIG. 6.

The means 17 for adjusting the angle of rotation of the housing 6 about the support shaft 12 comprises a stopper ring 19 fixedly fitted around the shaft 12 and made rotatable with the shaft 12. An engaging piece 23 extends from the stopper ring 19 radially outwardly of the support shaft 12. The mount bracket 13 has a support piece 24 projecting therefrom toward the housing 6 and having a screw rod 25 mounted thereon by a nut 26 screwed on the rod.

Figure 7:
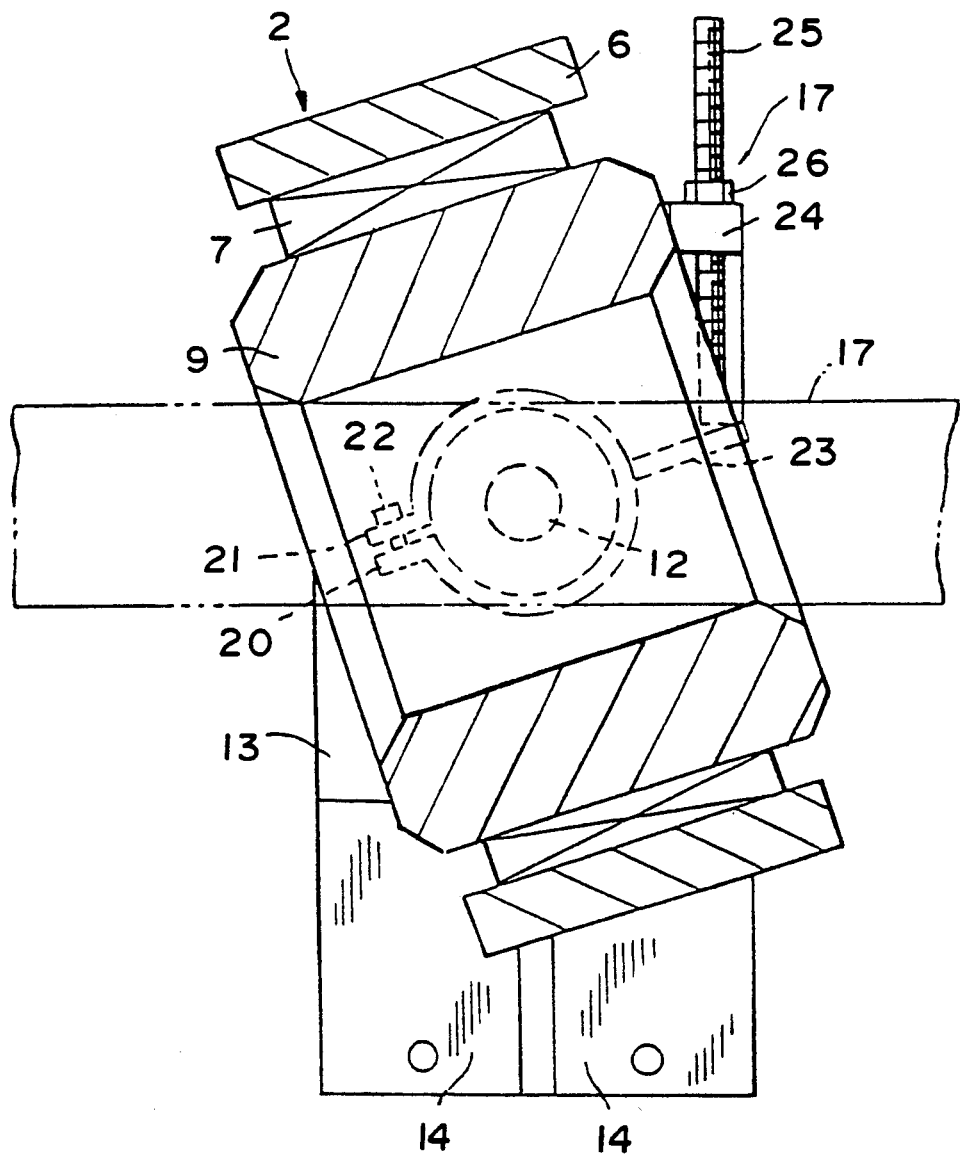

When the housing 6 is rotated about the support shaft 12 as seen in FIG. 7, the engaging piece 23 also rotates with the shaft 12 to come into contact with the end of the screw rod 25, whereby the angle of rotation of the housing 6 is set to a specified angle. In the state of FIG. 7, the outer periphery of an elongated workpiece M having a given outside diameter is supported by one end and the other end of the inner periphery of the contact ring 9.

Figure 8:
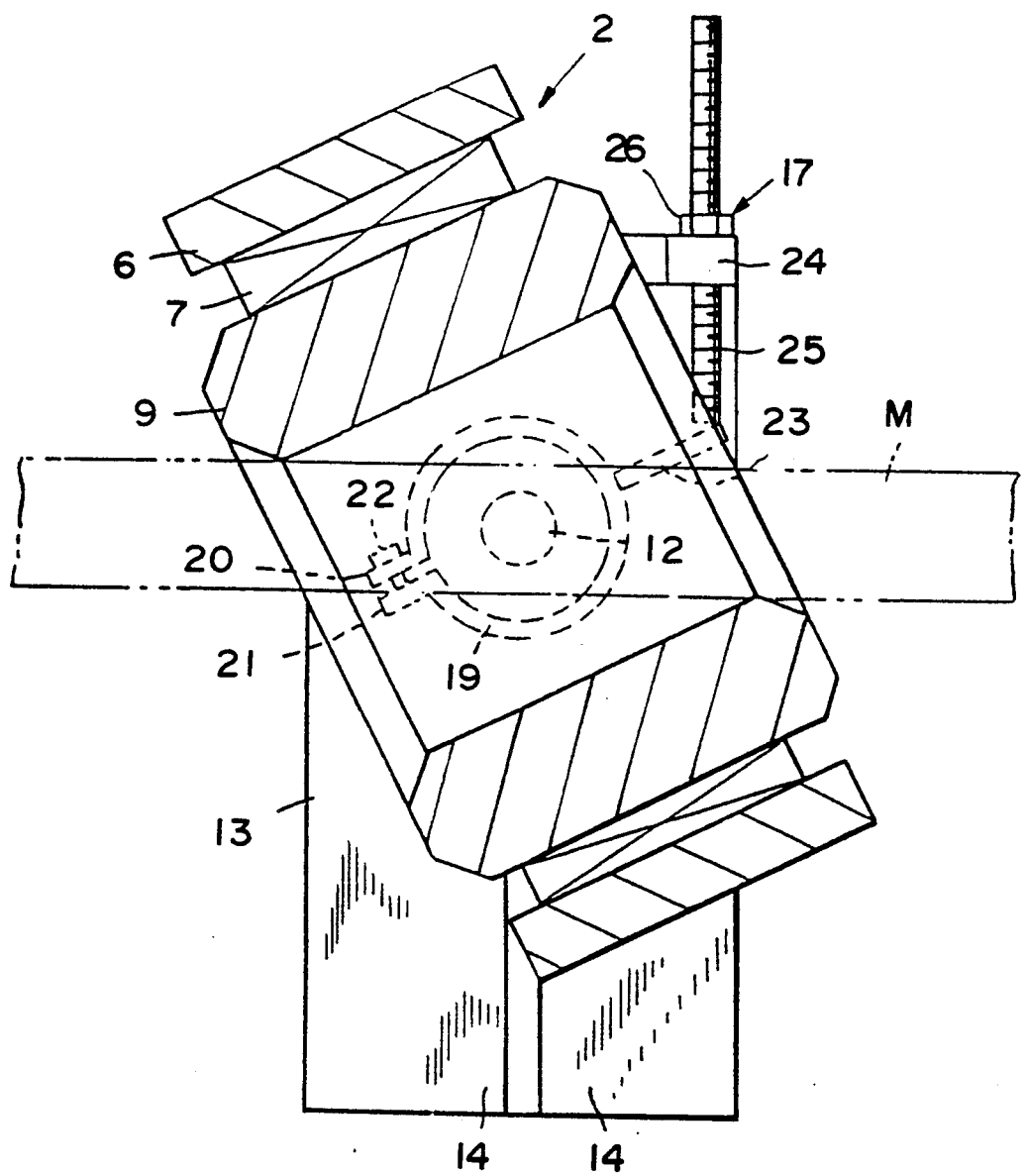

When an elongated workpiece M having a smaller diameter than the workpiece M of FIG. 7 is to be prevented from deflection, the screw rod 25 is rotated relative to the nut 26 and thereby shifted to adjust the position of contact of the engaging piece 23 with the screw rod 25 as shown in FIG. 8. This varies the angle of rotation of the housing 6 for adjustment, altering the angle of inclination of the rotational axis of the contact ring 9 relative to the rotational axis of the workpiece M to be handled, with the result that the workpiece M having a smaller diameter than the one shown in FIG. 7 can be supported at its outer periphery by the axially opposite ends of the inner periphery of the contact ring 9.

When a plurality of deflection preventing devices 2 are used for a single elongated workpiece M, an improved deflection preventing effect can be achieved.

Although the foregoing embodiments are used for feeding the elongated workpiece M longitudinally thereof, this mode of application is not limitative but the present invention is usable also for those which are not moved longitudinally thereof.

The elongated workpiece to be handled by the present device is not limited to one which is to be worked on by a machining apparatus. The present invention is applicable to any material which needs to be prevented from deflection while rotating about its longitudinal axis.

INDUSTRIAL APPLICATION

The invention can be utilized for preventing deflection of elongated materials rotating about their longitudinal axis.

What is claimed is:

1. A device for preventing deflection of an elongated workpiece rotating about its longitudinal axis, comprising a housing in the form of a hollow cylinder, and a contact ring rotatably mounted on the housing for receiving the elongated workpiece inserted therethrough, the contact ring being rotatably fitted in the housing by a bearing, the housing being adjustably rotatable about a support shaft, the support shaft being perpendicular to the axis of rotation of the contact ring, the angle of inclination of the rotational axis of the elongated workpiece relative to the axis of rotation of the contact ring being variable by the rotation of the housing about the support shaft, the outer periphery of the elongated workpiece being rotatably supportable by the inner periphery of the contact ring at one axial end and at the other end thereof.

2. A device as defined in claims 1, wherein the contact ring is made of a material other than the metal.

3. A device as defined in claim 2, wherein the contact ring comprises two divided segments arranged side by side axially of the ring.

4. A device as defined in claim 2, wherein the device has means for adjusting the angle of rotation of the housing 6 about the support shaft.

5. A device as defined in claim 2, wherein the device has drive means for rotating the housing about the support shaft.

6. A device as defined in claims 1, wherein the contact ring comprises two divided segments arranged side by side axially of the ring.

7. A device as defined in claim 6, wherein the device has means for adjusting the angle of rotation of the housing about the support shaft.

8. A device as defined in claim 6, wherein the device has drive means for rotating the housing about the support shaft.

9. A device as defined in claim 1, wherein the device has means for adjusting the angle of rotation of the housing about the support shaft.

10. A device as defined in claim 9, wherein the device has drive means for rotating the housing about the support shaft.

11. A device as defined in claim 1, wherein the device has drive means for rotating the housing about the support shaft.

12. A device as defined in claim 1, wherein the contact ring comprises first and second rings at axially opposite ends thereof.

13. A device as defined in claim 12, wherein each of said first and second rings is provided with an annular cutout in one end face.

14. A device as defined in claim 13, wherein a contact portion is formed by the annular cutout at the inner periphery of the first and second rings of the contact ring; and wherein an annular spring is fitted in each annular cutout so as to extend around each contact portion.

* * * * *